United States Patent [19]

Rampel et al.

[11] 4,372,521
[45] Feb. 8, 1983

[54] ADJUSTING MECHANISM FOR THE SEAT OF AN AUTOMOBILE

[75] Inventors: Hans Rampel, Eicha; Peter Hess; Volkmar Schulz, both of Coburg, all of Fed. Rep. of Germany

[73] Assignee: Metallwerk Max Brose GmbH & Co., Coburg, Fed. Rep. of Germany

[21] Appl. No.: 85,308

[22] Filed: Oct. 16, 1979

Related U.S. Application Data

[63] Continuation of Ser. No. 888,503, Mar. 20, 1978, Pat. No. 4,228,981.

[30] Foreign Application Priority Data

Mar. 28, 1977 [DE] Fed. Rep. of Germany ....... 2713693

[51] Int. Cl.³ .......................................... F16M 13/00
[52] U.S. Cl. .................................... 248/430; 248/396
[58] Field of Search ............. 248/419, 420, 421, 424, 248/429, 430, 393, 396; 52/727, 728; 308/3-8; 164/98

[56] References Cited

U.S. PATENT DOCUMENTS

| 808,445 | 12/1905 | Gibbs et al. | 52/727 |
|---|---|---|---|
| 2,096,437 | 10/1937 | Potter | 248/430 |
| 2,500,316 | 3/1950 | Kramer | 308/3.8 |
| 2,678,082 | 5/1954 | Walker | 248/429 X |
| 2,890,915 | 6/1959 | Benham | 164/98 X |
| 3,079,118 | 2/1963 | Pickles | 248/420 |
| 3,105,670 | 10/1963 | Pickles | 248/420 |
| 3,157,441 | 11/1964 | Pickles | 308/3.8 |
| 3,692,271 | 9/1972 | Homier | 248/396 X |
| 3,926,397 | 12/1975 | Hunwicks | 248/430 |
| 4,018,448 | 4/1977 | Manson | 248/429 X |
| 4,228,981 | 10/1980 | Rampel | 248/430 |

FOREIGN PATENT DOCUMENTS

| 553721 | 3/1958 | Canada | 248/420 |
|---|---|---|---|
| 722446 | 11/1965 | Canada | 248/420 |

*Primary Examiner*—William H. Schultz
*Attorney, Agent, or Firm*—Toren, McGeady & Stanger

[57] ABSTRACT

Adjusting mechanism for a seat, particularly a seat of an automotive vehicle, in which the seat rests on carriers elongated in the direction of shifting movement, seat shifting guides being interposed, and the carriers being equipped with integrally connected, upwardly directed lugs which laterally back the seat shifting guides.

5 Claims, 11 Drawing Figures

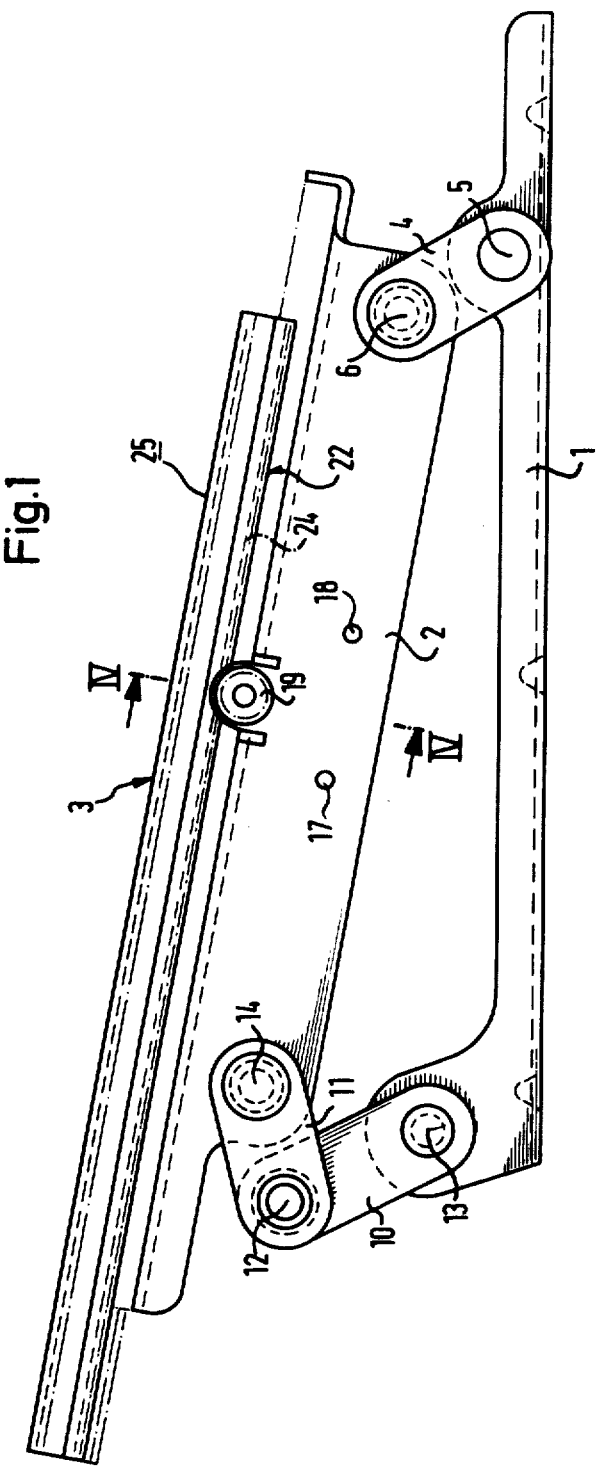

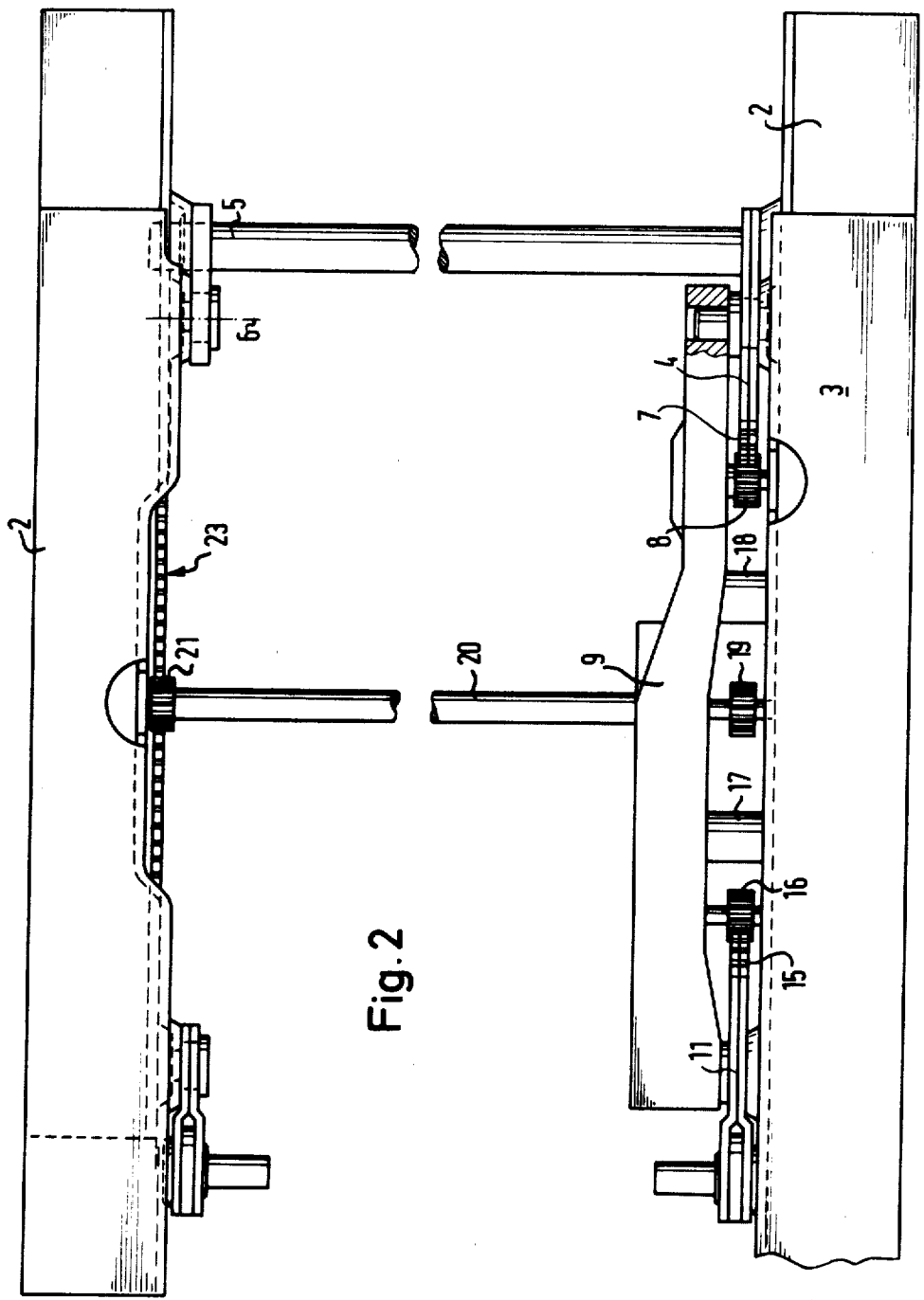

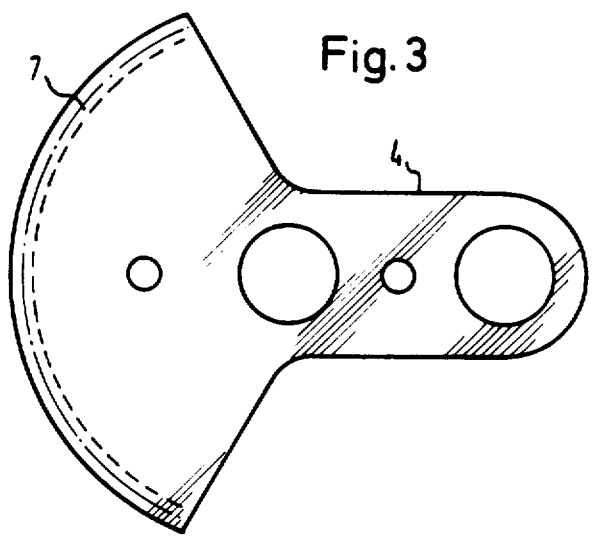
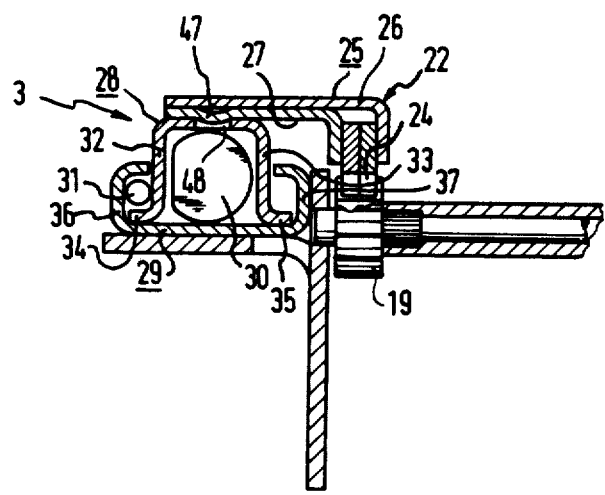

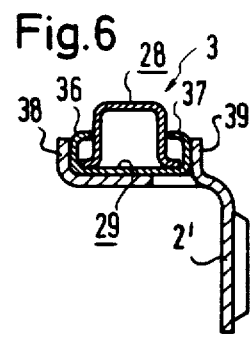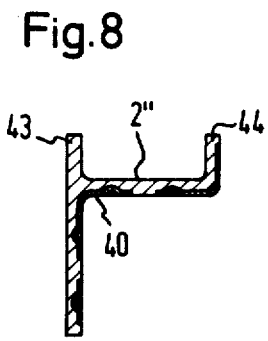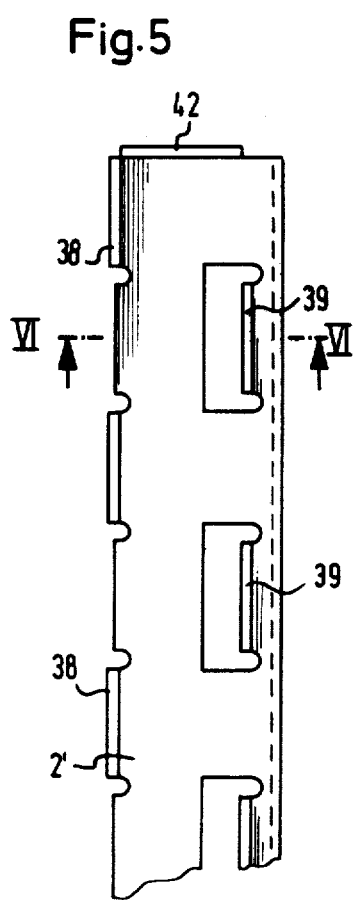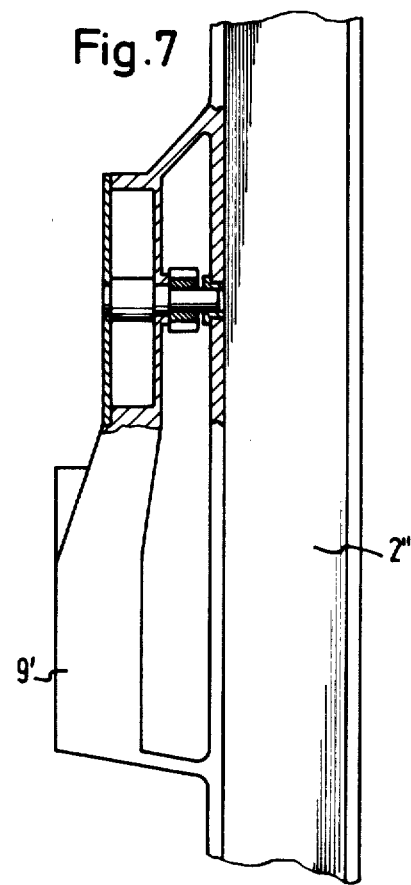

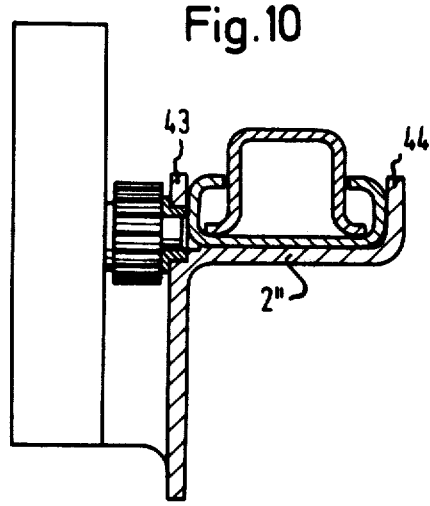
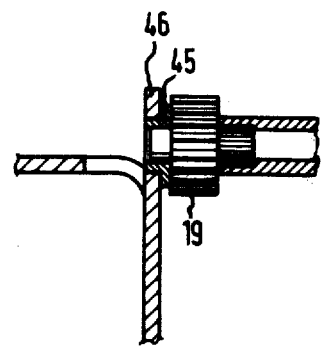
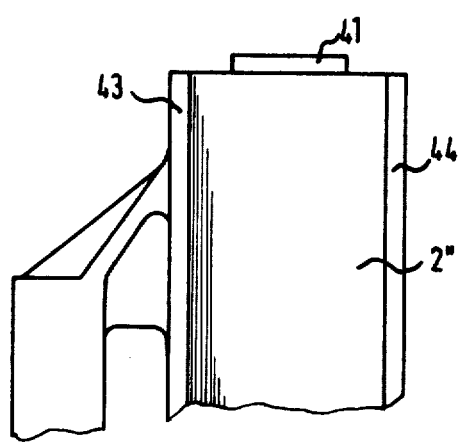

ADJUSTING MECHANISM FOR THE SEAT OF AN AUTOMOBILE

This is a continuation of application Ser. No. 888,503 filed on Mar. 20, 1978, now U.S. Pat. No. 4,228,981.

The invention relates to an adjusting mechanism for a seat, more specifically a seat of an automotive vehicle, in which the seat rests for longitudinal adjustment on carriers extending in the direction of shifting movement, a seat shifting guide arrangement being interposed between the seat and carriers.

It is possible in a known adjusting mechanism of this type that the lower part of the seat shifting guide arrangement is expanded so that the seat may be released when substantial forces act on the seat in an accident. It is known to prevent such expanding by employing U-shaped rails which are mounted additionally below the lower part of the seat shifting guide arrangement and thus laterally back the upwardly bent edges of the lower part. This known solution, however, is expensive.

The problem outlined above is solved according to the present invention in that the carriers are provided with integral, upwardly projecting flanges which laterally back the seat shifting guide arrangement. The provision of additional structural elements is avoided thereby.

The flanges in a preferred embodiment of the invention are lugs stamped partly out of the carrier of the seat shifting guide arrangement and bent upwardly. It is further preferred in this arrangement that the lugs on one longitudinal side be offset longitudinally from the lugs of the other longitudinal side. In this manner, excessive localized weakening of the carrier is avoided without loss in backing effect, which weakening could occur if the lugs of both sides were located opposite each other. The arrangement of stamped and bent flanges has the advantage of not causing burdening by additional weight and not requiring additional mounting costs.

The flanges may also be made unitary bodies with the carrier if the carrier consists of a pressure casting, particularly a zinc alloy diecasting in which the flanges are cast on. Obviously, the carrier needs to be designed differently for zinc diecasting than for press forming from sheet metal and is particularly provided with stiffening ribs. A portion of the stiffening ribs may simultaneously constitute the flanges which, in this instance, not only protect the lower part of the seat shifting guide arrangement against lateral expansion but also stiffen the carrier. If adequate stiffness cannot be achieved even by the provision of stiffening ribs, the carrier prepared by pressure casting and the lower part may further be reinforced by sheet metal inserts. Obviously, the lower part will be prepared by pressure casting if the carrier is prepared by pressure casting.

Zinc diecasting alloys offer the advantage of damping oscillations in the cast structural elements in a particularly effective manner.

An additional advantage resulting from the use of of zinc diecasting is achieved when the bearings for the pinions are cast in. This permits the use of special bearing materials. Moreover, several bearings may be spaced apart in a particular precise manner by this manufacturing technique.

Another advantageous feature of the invention derived from the use of pressure castings resides in the carrier being made as a unitary body with the casing of the transmission and/or motor casing. It is not possible so to design with stamped sheet metal parts as to work without additional fastenings, the cast housing being produced as a unitary body with the carrier and therefore being integrally connected with the carrier. The cast construction is distinguished not only by the absence of vibrations when driven, because any vibrations that may occur are well damped by the zinc diecasting material, but this arrangement has the added advantage of avoiding the amounting labor otherwise necessary for precise adjustment of shaft spacings.

The known seat is adjusted longitudinally by means of racks associated with the seat shifting guide arrangements. The racks as well as their mountings are made of wear resistant material which entails particularly high cost.

A reduction in cost is accomplished according to the invention by connecting the upper part of the seat shifting guide arrangement with a multipart rack comprising a row of teeth which consist of a wear resistant material and of mountings for the row of teeth consisting of at least one part of different material. The mounting or bracket may consist of readily shaped sheet steel whereas only the row of teeth, that is, the gearing consists of a wear resistant material so that the cost for the entire rack is substantially reduced which is of particular advantage in the mass production of such elements.

In a known seat adjusting mechanism of the type initially referred to, two racks are provided for longitudinal adjustment of the seat, each rack being associated with a respective seat shifting guide arrangement. There arises the problem of aligning the oppositely arranged racks exactly with each other in order to avoid distortion of the seat during longitudinal adjustment.

This problem is solved according to the invention by fixing the mounting or bracket of the row of teeth on the upper part of the seat shifting guide arrangement by a projection-and-hole connection for which projections are provided in one element and engage holes in the other element. This fixing of the rack is achieved with particular ease when the rack, as is the case in this invention, consists of a wear resistant part including the teeth, and a bracket or mounting of more easily shaped material in which the projections can be provided in a simple manner by a suitable stamping process.

Embodiments of the invention are illustrated, by way of example, in the appended drawing in which:

FIG. 1 shows an adjusting mechanism for a seat of an automotive vehicle in side elevation;

FIG. 2 is a top plan view of the mechanism of FIG. 1;

FIG. 3 illustrates an individual element of the adjusting mechanism;

FIG. 4 shows the mechanism in section on the line IV—IV in FIG. 1;

FIG. 5 is a fragmentary top view of a modified structural element for the same adjusting mechanism;

FIG. 6 shows the device of FIG. 5 in section on the line VI—VI;

FIG. 7 illustrates a modified adjusting mechanism similar to that of FIGS. 1 and 2 in fragmentary, longitudinal section; and FIGS. 8 to 11 show details of the embodiment of FIG. 7 in fragmentary sectional views.

The first embodiment of the adjusting mechanism for the seat of an automotive vehicle illustrated in FIGS. 1 and 2 is provided with a base 1, a carrier 2, and a seat shifting guide arrangement 3 on each side of the seat.

The rear end of each carrier 2 is connected with the associated base 1 by means of a hinged link 4 pivotally secured to the base by a pivot shaft 5 and to the carrier by a pivot shaft 6. The link 4 is individually shown in FIG. 3. Its end associated with the carrier 2 which projects beyond the pivot shaft 5 is equipped with a toothed segment 7 which meshes with a pinion 8 of a drive mechanism 9. The front end of the carrier 2 is hingedly connected to the base 1 by means of hinged links 10, 11, the links being connected with each other by a pivot shaft 12 and by means of respective pivot shafts 13, 14 with the base and the carrier. The hinged link 11 is equipped with a toothed segment 15 in the manner of the hinged link 6 which projects freely beyond the pivot shaft 14 and engages a pinion 16 of the drive arrangement 9. The drive arrangement 9 is fixedly fastened to one of the carriers 2 as is shown at 17 and 18.

When the two pinions 8 and 16 are turned simultaneously by a non-illustrated motor associated with the drive arrangement 9, the hinged links 4, 11 are simultaneously tilted so that the carrier 2 is shifted up or down while remaining parallel to itself. If only one of the pinions is actuated, the height of the seat is changed only at the end whose associated pinion is driven.

The drive arrangement 9 includes an additional pinion 19 mounted on a shaft 20 whose opposite end carries a further pinion 21. The pinions 19, 21 engage respective racks 22, 23 associated with seat shifting guide arrangements and thus respective sides of the seat. When the shaft 20 is driven in one or the other direction, the seat connected with the racks is shifted longitudinally either forward or rearward.

The cooperation of the rack 22 with the pinion 19 is best seen in FIG. 4. The rack 22 includes a row of teeth 24 of a wear resistant material and a mounting or bracket 25 assembled from two shaped sheet metal elements 26, 27. The row of teeth 24 is received between the sheet metal elements 26, 27 of the bracket 25 which, for this purpose, have downwardly offset edge portions. The sheet metal elements 26, 27 are otherwise fixedly connected with each other and fastened to the upper part 28 of the seat shifting guide arrangement 3. Projections 47 pressed out of the bracket 25 and engaging corresponding openings 48 in the upper part 28 precisely fix the bracket 25 in the direction of its elongation. The racks 22, 23 are thereby precisely aligned with each other. The upper part 28 is slidably guided in a lower part 29 and fixedly fastened to the seat. Low friction during shifting of the upper part 28 relative to the lower part 29 fastened on the carrier 2 is ensured by rollers 30 and by balls 31 interposed between the two parts. The upper part has two downwardly extending flanges 32, 33 to which outwardly offset edge portions 34, 35 are joined. The flanges 32, 33 are associated with the rollers 30 whereas the balls rest on the outwardly offset edge portions 34, 35, the latter being enveloped by upwardly and inwardly offset edge portions 36, 37 of the lower part 29.

In order to prevent the upwardly and inwardly extending edge portions 36, 37 of the lower part 29 of the seat shifting guide arrangement 3 from being bent outwardly in an accident so that the seat can break loose, flanges 38, 39 are provided on the two sides of the lower part 29 according to FIGS. 5 and 6, and back the edge portions 36, 37. The flanges 38, 39 are constituted by lugs stamped out of the carrier 2' and bent upwardly. In order to avoid a weakening of the carrier in any specific cross sectional portion, the flanges 38 on one side are offset longitudinally relative to the flanges 39 of the other side, so that a gap between two flanges 38 is located opposite each flange 39.

FIGS. 7 to 11 illustrate a modified embodiment in which the carrier does not consist of sheet metal stampings, but of a zinc alloy die-casting.

FIG. 7 shows a carrier 2" cast as a unitary body with the housing of the drive arrangement 9'.

FIG. 8 illustrates a section through the carrier 2" in which a sheet metal insert 40 is provided to guard against insufficient strength of the zinc diecasting.

FIG. 9 illustrates the provision of a terminal abutment 41, cast on in this embodiment, which prevents the upper part of the seat shifting guide arrangement from shifting relative to the lower part in the event of an accident so far that the seat breaks loose from the seat shifting guide arrangement. Such a terminal abutment is formed in the embodiment of the carrier illustrated in FIG. 5 and consisting of sheet metal stampings by a suitable lug 42 being bent upward. The terminal abutment may also be arranged in such a manner that it additionally holds the lower part fast.

FIG. 10 shows flanges 43, 44 cast as a unitary body with the carrier 2" and functionally equivalent to the flanges 38, 39 shown in FIG. 5.

FIG. 11 illustrates a bearing arrangement for the pinion 19. In this embodiment, a bearing bushing 45 of bearing metal is fastened in a rib 46 by inserting the bearing bushing in the mold in which the carrier is thereafter diecast so that the bearing bushing is enveloped by the liquid metal. This procedure has the advantage of permitting precise distances between several bearings to be maintained.

What is claimed is:

1. An adjustment mechanism for a sliding seat such as a motor vehicle seat, comprising carriers elongated in the direction of sliding seat movement, a seat shifting guide arrangement supported on said carriers for adjustment in the direction of sliding seat movement, each carrier having integrally connected upwardly extending flanges for laterally supporting said seat shifting guide arrangement, said seat shifting guide arrangement comprising an upwardly open U-shaped track supported on each said carrier with the upper edges of the U-shaped track being bent inwardly toward one another, a downwardly open U-shaped track being located within said upwardly open U-shaped track and arranged to support the sliding seat, said downwardly open U-shaped track having the lower edges thereof bent outwardly within and slidably guided in contact with said upwardly open U-shaped track, and said upwardly extending flanges on said carrier laterally supporting the upwardly extending outside surfaces of said upwardly open U-shaped track, said upwardly extending flanges are punched out of said carrier in a lug-like form and are bent upwardly therefrom into laterally supporting contact with said upwardly open U-shaped track, and said lug-like upwardly extending flanges comprise a number of said flanges extending along said carrier in the direction of sliding seat movement with said lug-like flanges on opposite sides of said upwardly open U-shaped track being offset relative to one another in the direction of sliding seat movement.

2. An adjustment mechanism for a sliding seat such as a motor vehicle seat, comprising carriers elongated in the direction of sliding seat movement, a seat shifting guide arrangement supported on said carriers for adjustment in the direction of sliding seat movement, each said carrier having integrally connected upwardly extending flanges for laterally supporting said seat shifting guide arrangement, said seat shifting guide arrangement comprising an upwardly open U-shaped track supported on each said carrier with the upper edges of the U-shaped track being bent inwardly toward one another, a downwardly open U-shaped track being located within said upwardly open U-shaped track and arranged to support the sliding seat, said downwardly open U-shaped track having the lower edges thereof bent outwardly within and slidably guided in contact with said upwardly open U-shaped track, and said upwardly extending flanges on said carrier laterally supporting the upwardly extending outside surfaces of said upwardly open U-shaped track, and each of said carriers having a terminal abutment at at least one end thereof extending upwardly from said carrier in the path of said downwardly open U-shaped track for limiting movement in the direction of sliding seat movement of said downwardly open U-shaped track relative to said carrier.

3. An adjustment mechanism for a sliding seat such as a motor vehicle seat, comprising carriers elongated in the direction of sliding seat movement, a seat shifting guide arrangement supported on said carriers for adjustment in the direction of sliding seat movement, each said carrier having integrally connected upwardly extending flanges for laterally supporting said seat shifting guide arrangement, said seat shifting guide arrangement comprising an upwardly open U-shaped track supported on each said carrier with the upper edges of the U-shaped track being bent inwardly toward one another, a downwardly open U-shaped track being located within said upwardly open U-shaped track and arranged to support the sliding seat, said downwardly open U-shaped track having the lower edges thereof bent outwardly within and slidably guided in contact with said upwardly open U-shaped track, and said upwardly extending flanges on said carrier laterally supporting the upwardly extending outside surface of said upwardly open U-shaped track, said carriers being formed of a die cast metal and said upwardly extending flanges being formed integrally with said carriers, and bearings are cast integrally with said die cast carriers for rotatably supporting pinions for moving said downwardly open U-shaped tracks in the direction of sliding seat movement.

4. An adjustment mechanism, for a sliding seat such as a motor vehicle seat, comprising carriers elongated in the direction of sliding seat movement, a seat shifting guide arrangement supported on said carriers for adjustment in the direction of sliding seat movement, each said carrier having integrally connected upwardly extending flanges for laterally supporting said seat shifting guide arrangement, said seat shifting guide arrangement comprising an upwardly open U-shaped track supported on each said carrier with the upper edges of the U-shaped track being bent inwardly toward one another, a downwardly open U-shaped track being located within said upwardly open U-shaped track and arranged to support the sliding seat, said downwardly open U-shaped track having the lower edges thereof bent outwardly within and slidably guided in contact with said upwardly open U-shaped track, and said upwardly extending flanges on said carrier laterally supporting the upwardly extending outside surfaces of said upwardly open U-shaped track, brackets are secured to the upper surface of said downwardly open U-shaped tracks, and toothed racks are located laterally alongside said downwardly open U-shaped tracks and extend in the direction of sliding seat movement, said brackets supporting said toothed racks for the adjustment of the sliding seat.

5. An adjustment mechanism, as set forth in claim 4, wherein one of said brackets and the upper surface of said downwardly open U-shaped tracks has openings therein and the other one of said brackets and said downwardly open U-shaped tracks has projections for interengagement in the openings for attaching said brackets to said downwardly open U-shaped tracks.

* * * * *